C. L. BOWDEN.
WHEEL ALINING GAGE.
APPLICATION FILED FEB. 26, 1916.
1,265,599.
Patented May 7, 1918.
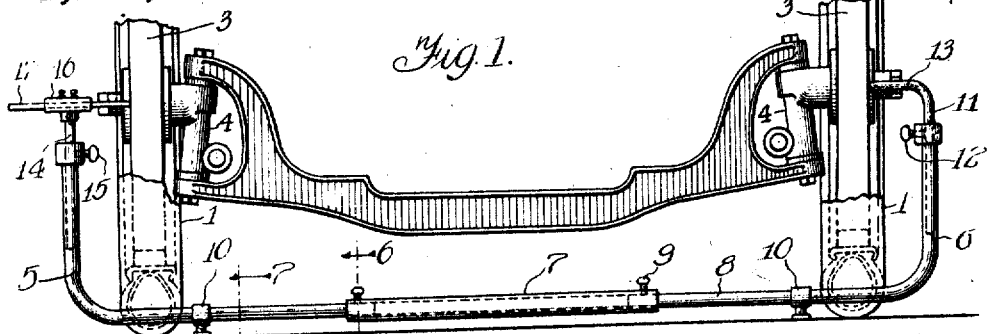
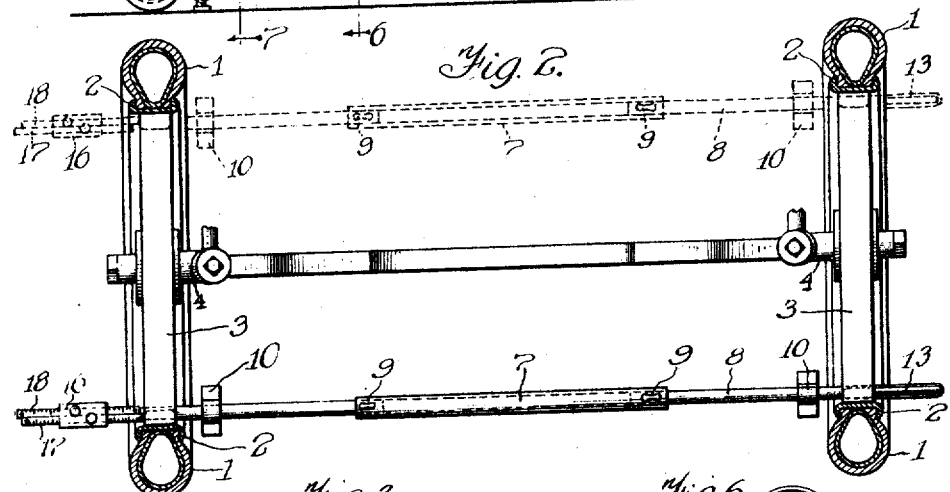
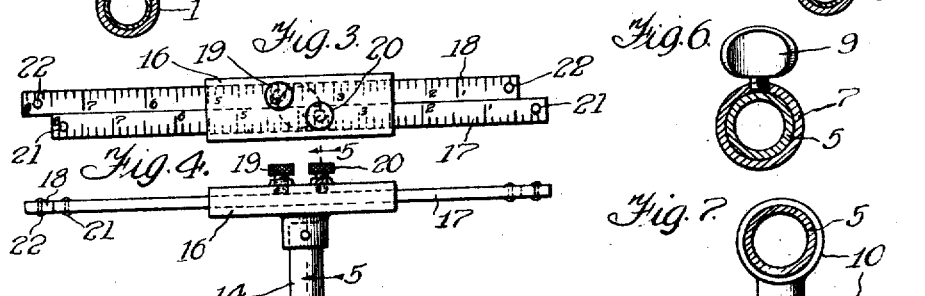
Witness:
A. J. Sauser
J. M. Schilling
Inventor:
Charlie L. Bowden
By William E. Williams
Atty.

UNITED STATES PATENT OFFICE.

CHARLES LEONARD BOWDEN, OF CHICAGO, ILLINOIS.

WHEEL-ALINING GAGE.

1,265,599.  Specification of Letters Patent.  Patented May 7, 1918.

Application filed February 26, 1916. Serial No. 80,617.

*To all whom it may concern:*

Be it known that I, CHARLES LEONARD BOWDEN, of Chicago, county of Cook, and State of Illinois, have invented a new and useful Improvement in Wheel-Alining Gages, of which the following is a specification.

When the wheels of a vehicle do not properly aline with each other greater resistance is encountered in moving the vehicle and more energy is necessarily expanded in the form of traction. Further, greater wear and strain are developed on the vehicle in use, wearing out the bearings more or less irregularly, and putting undue strains on parts of the gear. In the case of automobiles and vehicles having rubber tires an incorrect alinement of the wheels occasions serious tire wear and is the cause, often, of wearing out a rubber tire quickly, which amounts to considerable financial loss.

Gages for measuring the adjustment of the wheels in relation to each other have been heretofore used but have been so clumsy, awkward, inconvenient and of such a character that mistakes were easily made, that their use has not been very general, and at no time entirely satisfactory.

An object of this invention is to provide a gage so simple and convenient in use that it will be largely employed to prevent loss from lack of alinement of the wheels of automobiles, and a further object is to do this, without disturbing any part of the vehicle, in such manner that any person alongside the vehicle may see at a glance the conditions as to alinement. With these ends in view the distance between the outer face of the fellies of a pair of wheels is measured both in front and rear of the axle and at a height equal to that of the axle. For making such measurements, use is made of an extensible base or bar supported by the floor and having at each end upwardly extending members or arms, one bearing an inwardly projecting contact member to make contact with the lateral face of the felly of one wheel, and the other bearing two analogous members mounted side by side to slide independently to and from the outer face of the felly of the companion wheel of the pair. These two sliding members are provided with scales and provision is made for locking them independently. If the first member mentioned be used with one of the sliding member to obtain the width in front of the axle and the same member be used with the other of the two sliding members to ascertain the width in the rear of the axle, two widths will be registered side by side so that any variation will be known by mere inspection.

Reference will be had to the accompanying drawings in which Figure 1 is a front elevation of a pair of automobile wheels with my gage in position of measurement. Fig. 2 is a plan view similar to that of Fig. 1. Fig. 3 is a plan detail of the indexing scales or measuring rules. Fig. 4 is an elevation of the devices of Fig. 3. Fig. 5 is a section on the line 5—5. Fig. 4. Fig. 6 is a section on line 6—6 of Fig. 1. Fig. 7 is a section on line 7—7 of Fig. 1.

In the drawings 1 indicates the rubber tires of an automobile vehicle. 2 the rims of the wheels, and 3 the fellies. 4 indicates the usual knuckles of the jointed axles of the front wheels. 5 indicates one arm of my gage frame, and 6 indicates the other arm. These arms are connected together at the central portions by telescoping section 7 and are secured together in any desired position by the thumb screws 9, this part of the structure constituting a longitudinally extensible base which is provided with feet or blocks 10 which rest on the floor and sustain the gage in an upright position when desired.

At the right end 6 of my gage I provide the registering or contact block 11 which is mounted to slide in the tubular end of arm 6 and is secured in any suitable adjustment by the thumb screw 12. The end 13 is rounded off slightly to make neat contact surface for engagement with the felly or rim of the wheel.

In the left arm 5 there is mounted the spindle 14, which is held in any desired adjustment by the thumb screw 15 in the same manner as block 11. On the top of spindle 14 there is mounted a keeper block 16 carrying sliding rules or measuring scales 17 and 18, and these rules are secured in any desired position by thumb screws 19 and 20, the projections 21, 22, limiting the sliding of the scales in the block 16.

When the instrument is carried about in the garage or not in use the two sections 5 and 6 are shoved together so far as the construction will permit, this being for both convenience and security of the apparatus in storage and handling.

In use the arms are adjusted approximately, the gage is laid upon the floor, pushed beneath the rear side of the wheels, and rotated to bring the arms 5, 6 to upright position and allow the blocks 10 to rest upon the floor, as shown. The members 11 and 14 are then adjusted to suit the height of the axles, 13 is brought against the felly on one side and one of the scale bars, e. g. 22, is moved against the felly of the companion wheel and fixed by the setscrew 19. The instrument is then rotated to the floor, withdrawn, and similarly set up on the front side of the wheels, the member 13 being brought against the felly as before and the other scale bar is adjusted against the corresponding felly and clamped. The two scales then show at a glance any variation in the two widths registered, that is indicate without calculations or reliance upon unseen work of other persons the conditions as to alinement.

What I claim is:—

1. The combination with a floor supported base having an upwardly extending arm at each end, of a member projecting laterally from one of said arms to meet the lateral face of a wheel, two analogous longitudinally adjustable members side by side projecting in the opposite direction from the other arm and in approximate alinement with the member first mentioned, to meet the lateral face of a second wheel upon the same axle, and means for independently securing said analogous members in any desired adjustment.

2. The combination with a base adapted to stand in stable position upon a plane floor, of an inwardly extending member supported by and above one end of the base in position for making contact with the outer lateral face of a wheel rim, two scale bearing contact members approximately alining with the member first mentioned supported side by side by and above the opposite end of the base and arranged for independent adjustment to and from the corresponding part of the rim of a companion wheel upon the same axle, and means for independently locking said two contact members, whereby a pair of wheels having been gaged upon one side of their center by the use of one of said two members may be gaged upon the opposite side by the use of the other of said two members and the amount of any variation may be indicated by the adjacent scales.

3. In a device of the class described a gage base adapted to span the outside of vehicle wheels, supporting blocks on the back of the base adapted to rest on the floor and support the base with its arms in an upright position, a contact piece mounted on one arm of the base in a manner to be adjusted to the center line of the wheels when the base is supported upright on its blocks, a plurality of measuring devices mounted on the other gage arm adapted to be adjusted up and down and to and from the wheel edges, and separate means for locking each measuring device.

4. A floor supported gage base bearing at one end a contact member adjustable to the height of the axle and at the other end adjacent scale bars similarly adjustable and independently slidable to make contact with a wheel, and means for locking the scale bars; whereby in using one scale bar to measure the width of the pair of wheels in front of the axle and the other scale bar to measure the width in the rear of the axle, the two measurements appear side by side.

5. The combination with a floor supported base bar of adjustable length provided at its ends with upwardly extending arms to lie outside the planes, respectively of the pair of wheels, an inwardly projecting contact member borne by one of said arms, independently slidable scale bars projecting oppositely inward from the opposite of said arms, means by which the height of said member and bars may be adjusted, and means for independently locking the two bars.

In witness whereof, I herewith subscribe my name on this 19th day of February, 1916.

CHARLES LEONARD BOWDEN.

Witnesses:
J. M. SCHILLING,
R. F. McMAHON.